(12) United States Patent
Cheng et al.

(10) Patent No.: US 10,759,015 B2
(45) Date of Patent: Sep. 1, 2020

(54) METHOD AND SYSTEM FOR MACHINING

(71) Applicant: ABB Schweiz AG, Baden (CH)

(72) Inventors: Shaojie Cheng, Shanghai (CN);
Diamond Daimeng Dong, Shanghai
(CN); Lei Mao, Shanghai (CN)

(73) Assignee: ABB Schweiz AG, Baden (CH)

( * ) Notice: Subject to any disclaimer, the term of this patent is extended or adjusted under 35 U.S.C. 154(b) by 311 days.

(21) Appl. No.: 15/940,066

(22) Filed: Mar. 29, 2018

(65) Prior Publication Data

US 2018/0281138 A1    Oct. 4, 2018

Related U.S. Application Data

(63) Continuation of application No. PCT/CN2015/091072, filed on Sep. 29, 2015.

(51) Int. Cl.
*B23Q 15/007* (2006.01)
*B25J 11/00* (2006.01)
(Continued)

(52) U.S. Cl.
CPC ............ *B23Q 15/0075* (2013.01); *B23C 3/12* (2013.01); *B24B 9/00* (2013.01); *B24B 27/0038* (2013.01);
(Continued)

(58) Field of Classification Search
CPC ......... B23Q 15/0075; B23C 3/12; B24B 9/00; B24B 27/0038; B25J 9/006; G05B 2219/45062; G05B 2219/49384
See application file for complete search history.

(56) References Cited

U.S. PATENT DOCUMENTS 2,675,602 A    4/1954   Kern
2,732,771 A    1/1956   Kerns
(Continued)

FOREIGN PATENT DOCUMENTS

CN     2780406 Y    5/2006
CN   103990856 A    8/2014
(Continued)

OTHER PUBLICATIONS

Chinese Search Report issued in Chinese Application No. 2015800820751 (4 pages).
(Continued)

*Primary Examiner* — Dung Van Nguyen
(74) *Attorney, Agent, or Firm* — Taft Stettinius & Hollister LLP; J. Bruce Schelkopf

(57) ABSTRACT

A method and a system for machining a work piece by a machining tool are provided. The method includes relatively moving the machining tool against the work piece to apply machining feeds therebetween. The contact points at the work piece are arranged on the area of the work piece to be machined, and the contact points at the machining tool form a curve on the machining tool surface. The system includes a manipulator, a machining tool and a controller being adapted for controlling the manipulator to operate the machining tool according to the method as above. With this solution, the system can generate wave paths of a machining tool, so as to extend the life of the tool and ensure the processing quality.

19 Claims, 4 Drawing Sheets

(51) Int. Cl.
  *B24B 9/00* (2006.01)
  *B23C 3/12* (2006.01)
  *B24B 27/00* (2006.01)
  *B25J 9/16* (2006.01)

(52) U.S. Cl.
  CPC ........... *B25J 9/1664* (2013.01); *B25J 11/006* (2013.01); *G05B 2219/45062* (2013.01); *G05B 2219/49384* (2013.01)

(56) References Cited

U.S. PATENT DOCUMENTS

| | | | |
|---|---|---|---|
| 3,599,531 | A | 8/1971 | Wright |
| 4,799,836 | A | 1/1989 | Kurius et al. |
| 4,993,196 | A | 2/1991 | Kobayashi et al. |
| 5,067,860 | A | 11/1991 | Kobayashi et al. |
| 2009/0199690 | A1* | 8/2009 | Sun ................. B26F 1/3806 83/523 |
| 2013/0116822 | A1* | 5/2013 | Atohira ............. G05B 19/4097 700/255 |
| 2013/0244551 | A1 | 9/2013 | Liu |
| 2013/0273818 | A1* | 10/2013 | Guan ................ B25J 11/0065 451/270 |
| 2014/0113525 | A1* | 4/2014 | Chan ................. B25J 9/1679 451/5 |
| 2015/0005923 | A1 | 1/2015 | Gu |
| 2018/0161952 | A1* | 6/2018 | Gu .................... B24B 27/0038 |

FOREIGN PATENT DOCUMENTS

| | | |
|---|---|---|
| CN | 104249195 A | 12/2014 |
| DE | 102011054885 A1 | 5/2013 |
| JP | 01171713 A | 6/1989 |
| JP | 02048154 A | 2/1990 |
| JP | H03-196960 A | 8/1991 |
| JP | 04105813 A | 4/1992 |
| JP | H05301156 A | 11/1993 |
| JP | 08281542 A | 10/1996 |
| JP | 2006167842 A | 6/2006 |
| JP | 2011218452 A | 4/2011 |
| JP | 2015009324 A | 1/2015 |
| WO | 2006/015761 A1 | 2/2006 |
| WO | 2015019916 A1 | 2/2015 |

OTHER PUBLICATIONS

Third Chinese Office Action dated Nov. 4, 2019 issued in Chinese Application No. 201580082075I (11 pages).
Chinese Office Action, Chinese Patent Application No. 201580082075.1, dated Sep. 5, 2018, 10 pages including English Translation.
Chinese Search Report, Chinese Patent Application No. 201580082075.1, dated Sep. 5, 2018, 4 pages including English Translation.
State Intellectual Property Office of the P.R. China, International Search Report & Written Opinion issued in corresponding Application No. PCT/CN2015/091072, dated Jun. 20, 2016, 9 pp.
Japanese Office Action, Japanese Patent Application No. 2018-535213, dated Jan. 29, 2019, 23 pages including machine translation in English.
Chinese Office Action, Chinese Patent Application No. 201580082075.1, dated Apr. 23, 2019, 9 pages including English translation.
Chinese Search Report, Chinese Patent Application No. 201580082075.1, dated Apr. 23, 2019, 4 pages including English translation.
Extended European Search Report, European Patent Application No. 15905042.6, dated Jun. 17, 2019, 12 pages.
Japan Patent Office, Office Action in corresponding application No. 2018-535213, dated Sep. 17, 2019, 6 pp.
The Patent Office of People's Republic of China, Fourth Office Action issued in corresponding Chinese application No. 2015800820751, dated Apr. 27, 2020, 11 pp.
Japanese Decision of Rejection issued in Japanese Application No. 2018-535213 dated Jun. 2, 2020 (2 pages).
Japanese Decision of Dismissal of Amendment issued in Japanese Application No. 2018-535213 dated Jun. 2, 2020 (13 pages).
The Patent Office of People'S Republic of China, Fifth Office Action issued in corresponding Chinese application No. 2015800820751, dated Jul. 3, 2020, 12 pp.

* cited by examiner

METHOD AND SYSTEM FOR MACHINING

TECHNICAL FIELD

The present invention relates to a method and system for machining, and more particularly, to a method for deburring or grinding a work piece with a tool and a robot system using the same.

BACKGROUND ART

A tool path is the path that a tool may traverse to perform an operation on an object. For example, a tool path may be the path that a deburring tool moves along a work piece edge and in contact with the contour of the work piece to be deburred. A tool path may comprise a series of points. Each point may correspond to a position within a reference coordinate system of the tool.

According to most robotic applications such as deburring or grinding, machining tools are required to contact directly with the work pieces to be processed. As shown in FIG. 1, normally a single contact point or a circle of fixed contact points of a tool are programmed to move through a predetermined tool path("normal tool path") during the machining process. Since the tool always contacts the work pieces by one or several fixed contact points, it gets abrasive and worn quickly and the life of the tool will also be shortened.

SUMMARY OF INVENTION

Therefore, it would be desirable to have a method and system that takes into account the issues discussed above, and defines a flexible contact area instead of a fixed contact point or part of the tool for machining.

One of the objectives of the present invention is to propose a solution for generating wave tool paths of a machining tool, so as to extend the life of the tool and ensure the processing quality.

According to one aspect of the present invention, there is provided a method for machining a work piece by a machining tool. The method comprises relatively moving the machining tool against the work piece to apply machining feeds therebetween. The contact points at the work piece are arranged on the area of the work piece to be machined, and the contact points at the machining tool surface form a curve on the machining tool surface. The relative motion involves translational motion and/or rotational motion. Since the machining is accomplished by engaging a series of contact points arranged in a curve form on the surface of the tool rather than concentrating on one contact point or part, the effect of abrasion can be distributed among a multiple of contact points and each of the contact points will be worn less. Thus, the life cycle of the tool can be prolonged.

According to one embodiment of the present invention, the machining feedsare adapted to give uniform surface finishing of the work piece.

According to one embodiment of the present invention, the method further comprises rotating the machining tool along its axis. This makes it possible to extend the contact points on the machining tool surface to wrap the axis, thus the contact area can be enlarged.

According to one embodiment of the present invention, at least two contact points on the curve are overlapped. This curve is a continuous curve wrapped the axis of the machining tool and it can be intersectional.

According to one embodiment of the present invention, the contact points at the machining tool are substantially even distributed on the machining tool surface. The effect of abrasion can be distributed among a multiple of contact points and each of the contact points will be worn less. Thus, the life cycle of the tool can be prolonged.

According to one embodiment of the present invention, the curve is a periodical wave. Due to the periodicity of the wave, this renders it more easily for offline programming to place an intersectional wave with similar wave form side by side on the machining tool surface so as to form a uniform contact area on the machining tool surface.

According to one embodiment of the present invention, the periodical wave is sine-shaped or cosine-shaped.

According to one embodiment of the present invention, the machining feeds are regulated by adjusting radial offset of the machining tool with respect to the contact point. Therefore, the work piece can be machined without overcutting or leaving the work piece.

According to one embodiment of the present invention, the radial offset of the machining tool is adjusted to the radius of the machining tool with respect to the contact point.

According to another aspect of the present invention, there is provided a robot system, which includes a manipulator, a machining tool and a controller. The controller is being adapted for controlling the manipulator to operate the machining tool according to the method as above.

The present disclosure is advantageous that it provides the method and system for wave tool paths generation with easy settings, cost effectiveness and high processing quality.

BRIEF DESCRIPTION OF DRAWINGS

The subject matter of the invention will be explained in more detail in the following text with reference to preferred exemplary embodiments which are illustrated in the drawings, in which.

PREFERRED EMBODIMENTS OF THE INVENTION

Reference will now be made in detail to several embodiments of the present invention, example of which are illustrated in the accompanying figures. It is noted that wherever practicable similar or like reference numbers may be used in the figures, and may indicates similar or like functionality. The figures depict embodiments of the present invention for purposes of illustration only. One skilled in the art will readily recognize from the following description that alternative embodiments of the structures and methods illustrated herein may be employed without departing from the principles of the present invention described therein.

During the machining process, the machining tool relatively moves against the work piece to apply machining feeds therebetween. Namely the machining tool moves in translation and/or rotation while the work piece keeps still, or the work piece moves in translation and/or rotation while the machining tool keeps still, or both the machining tool and the work piece move in translation and/or rotation simultaneously. For example, the tool is shaped like a circular truncated cone. A primary motion is provided by rotating the tool around its axis and the rotating tool removes the material from the contact points at the work piece to generate a desired shape, such as a polished surface or edge of the work piece. The feed motion is achieved by relative motion of the tool and the work piece in a direction of a wave form, which leaves an abrasion on a surface of the circular truncated cone of the tool. As an alternative, the tool may have a plane end face and can be moved in a sequence of steps along the surface or edge of the work piece to be machined, wherein different parts of its plane end face are fed to the grinding area of the work piece. Therefore, contact points of the abrasion on the tool see a curve, as well. When the machining tool directly contacts the work piece to be machined, the contact points at the work piece are arranged on the area of the work piece to be machined. Since the machining is accomplished by engaging a series of contact points arranged in a curve form on the surface of the tool rather than concentrating on one contact point or part, the effect of abrasion can be distributed among a multiple of contact points and each of the contact points will be worn less. Thus, the life cycle of the tool can be prolonged.

Figure 1:
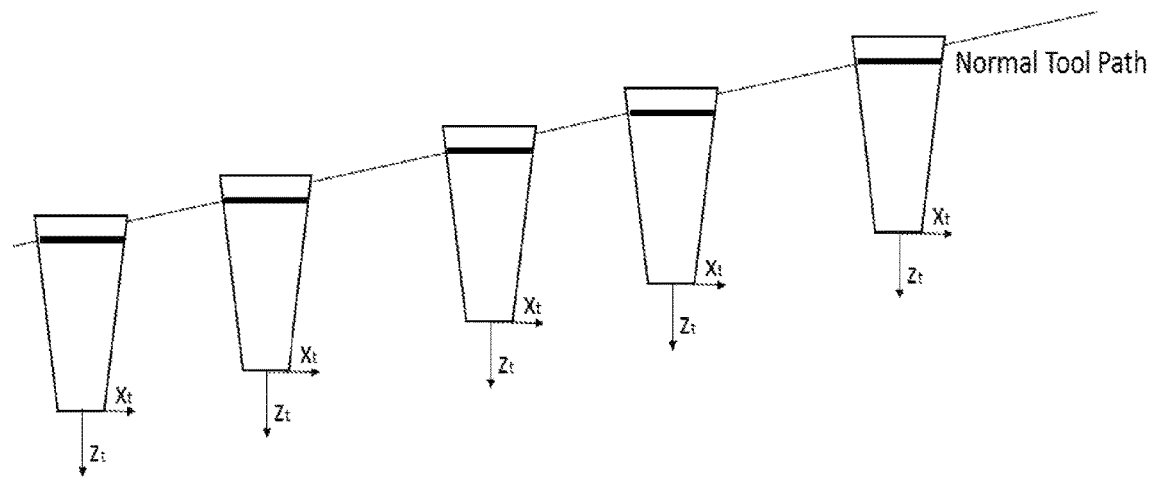
FIG. 1 illustrates a schematic diagram of a normal tool path of a machining tool.
Figure 2:
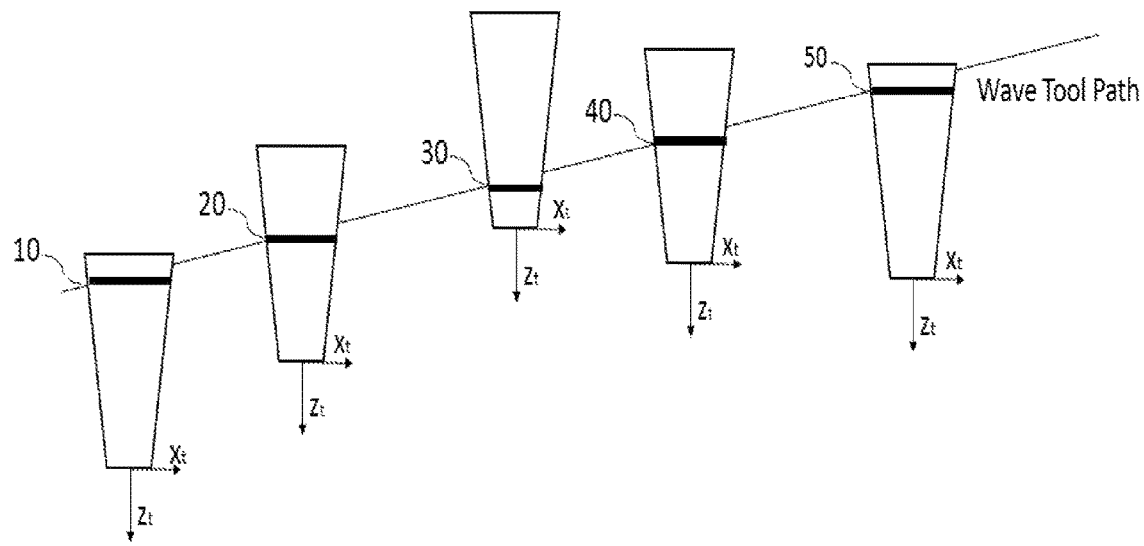
FIG. 2 illustrates schematic diagram of a wave tool path of a machining tool generated by manual programming according to an embodiment of present invention.

FIG. 2 illustrates schematic diagram of a motion track of a machining tool. The tool is circular truncated cone shaped. The contact points 10, 20, 30, 40, 50 at the machining tool are not limited to a single contact point or a circle of fixed contact points, they form a larger contact area of the tool for machining, which enables more parts on the tool be involved in robotic machining process. The contact points on the surface of the tool fluctuate along a direction perpendicular to the axis of the tool, thus the process of machining not only applies to the points on a sectional circle of the tool or a single point on the tool, but also contact points beyond those on the tool surface. A wider contact area of the usage range of the tool renders the machining work load can be distributed among more contact points, thus reducing the average abrasion effect thereof. Furthermore, the contact points 10, 20, 30, 40, 50 at the machining tool are substantially even distributed on the machining tool surface, so that the tool can be worn evenly.

As shown in FIG. 2, the contact points 10, 20, 30, 40, 50 at the machining tool also form a wave form on the machining tool surface, which makes the tool path no longer a straight line but a curve similar to a wave ("wave tool path"). The wave on the abrasion of the machining tool surface can be a substantially periodical wave, e.g. sine-shaped or cosine-shaped, which ensures that the tool is worn evenly.

Human operators may define a contact area of a tool by manual programming. However, manual programming has proved to be much more time-consuming and labor-intensive than desired which leads to inconsistent processing quality. Moreover, inaccurate manual programming may generate improper tool path. Therefore, an offline programming method and system that could achieve the same effect with better processing quality are required.

Figure 3:
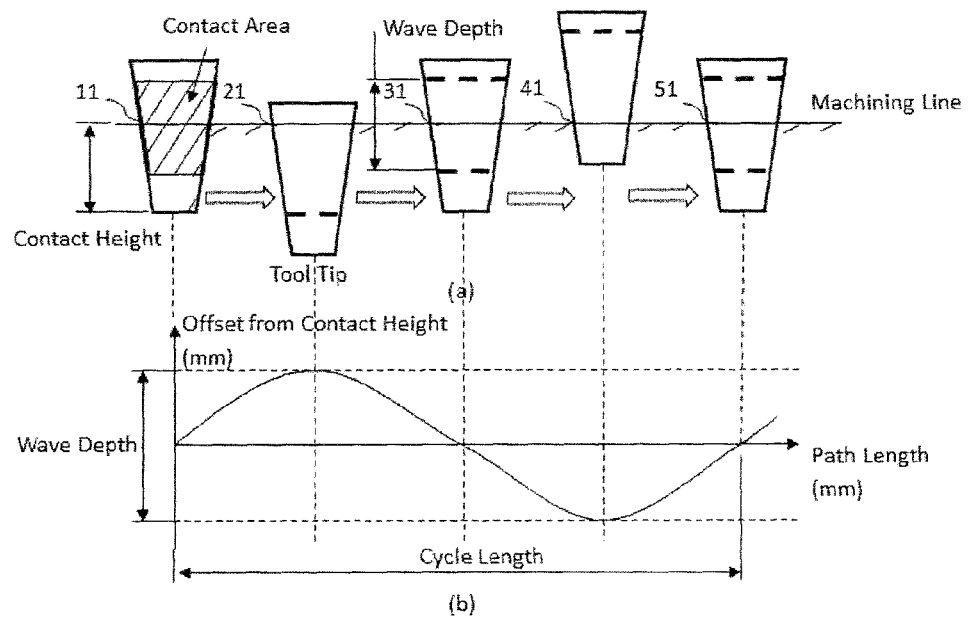
FIG. 3 illustrates a schematic diagram of a wave tool path of a machining tool generated by offline programming according to an embodiment of present invention.

FIG. 3 illustrates a schematic diagram of a wave tool path of a machining tool generated by offline programming. The machining tool relatively moves from left to right along the machining line as shown in (a). The path of the machining tool folios a sine-shaped periodical wave tool path as shown in (b). When the wave tool path solution applies, the tool moves in a wave tool path to ensure the contact area of the tool be involved in robotic machining process as broad as possible. At the same time, the tool keeps contacting with the work piece to apply machining feeds no matter which part of the area of the tool is used for machining at that moment.

The wavetool path of a machining tool is generated by offline programming by generating and synchronizing the following three movements: normal tool path, axial offset and radial offset.

The normal toolpath (hereinafter referred to as "first movement") defines the area of the work piece to be machined. The normal tool path is determined by contact height, which is the height from the tool tip to the default contact point that used as a single contact point or a circle of fixed contact points of the tool for machining.

The axial offset (hereinafter referred to as "second movement") is the offset from the contact height along the tool axis direction. The axial offset is determined by wave depth, which is the absolute usable range of the tool with default contact point as the center. In other words, the wave depth defines a scope of the contact area of the tool, namely the abrasion of the tool.

The radial offset (hereinafter referred to as "third movement") is the offset movement perpendicular to the tool axis direction to ensure the tool always contacts the work piece to be machined without overcutting or leaving the work piece. The radial offset is adjusted to the radius of the machining tool with respect to the contact point.

As shown in FIG. 3, when contact points 11, 31, 51 contact the work piece to be machined, the contact height is the height from the tool tip to the default contact point and the axial offset is zero. When the contact points 21, 41 are in use, the contact height reaches its maximum and minimum value respectively and the axial offset reaches its maximum absolute value in either positive or negative direction within the wave depth. The first movement and the second movement are synchronized, which means every time the first movement reaches a specific path length determined by the shape of the work piece to be machined, the second movement finishes reciprocating motion(s) along the tool axis direction within the wave depth, so as to extend the life of the tool. When the second movement finishes exactly one reciprocating motion, the first movement reaches one cycle length along the path length, the machining tool generates one cycle of wave tool path and the contact points at the machining tool form a periodical wave on the machining tool surface.

Figure 4A:
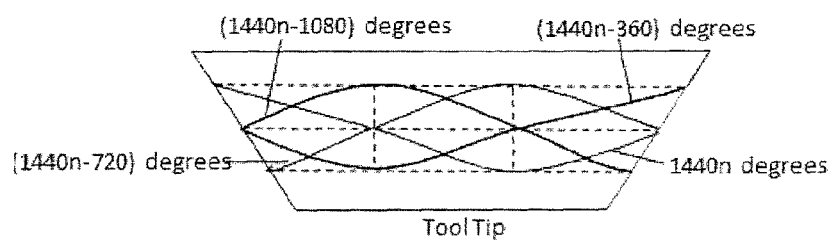
FIGS. 4A, 4B, 4C and 4D respectively illustrate an expanded view of a machining tool surface according to an embodiment of present invention.
Figure 4B:
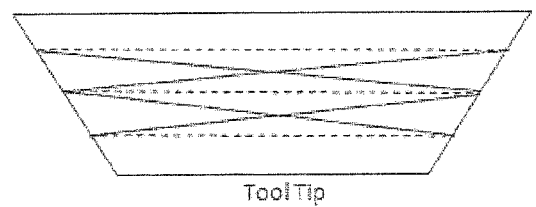
Figure 4C:
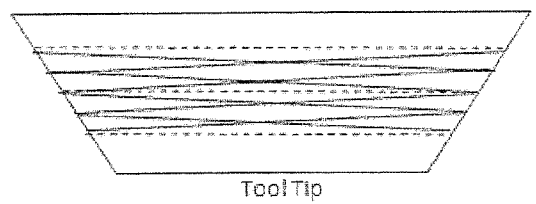
Figure 4D:
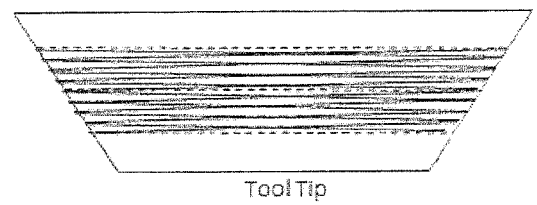

FIGS. 4A, 4B, 4C and 4D respectively illustrate an expanded view of a machining tool surface. As shown in FIG. 4A, within a cycle length, the tool rotates 480 degrees along its axis and the contact points at the tool form a sine-shaped periodical wave abrasion, wrapping the axis of the tool. In particular, when the tool rotates (1440n-1080) degrees (n=1, 2, 3 . . . ), the contact points at the tool form {3(n−1)+3/4} sine wave; when the tool rotates (1440n-720) degrees (n=0, 2, 3 . . . ), the contact points at the tool form {3(n−1)+3/2} sine wave; when the tool rotates (1440n-360) degrees (n=1, 2, 3 . . . ), the contact points at the tool form {3(n−1)+9/4} sine wave; when the tool rotates 1440n degrees (n=1, 2, 3 . . . ), the contact points at the tool form {3(n−1)+3} sine wave. FIGS. 4B, 4C and 4D respectively show abrasion of the tool under various scenarios, the tool rotation by 1440 degrees, 2880 degrees and 5760 degrees respectively along its axis within a cycle length and at least two contact points on the curve are overlapped. In this way, the contact points at the tool are substantially even distributed on the tool surface, so that the tool can be worn evenly.

However, it should be noted that the tool may rotate less than 360 degrees, for example, the tool rotates only 240 degrees within a cycle length.

During the machining process, it is necessary to define a machining offset so that the tool may contact the work piece to be machined to remove appropriate amount of the material from the work piece without overcutting or leaving the work piece, especially when the tool tip is not cylinder. To solve this, the wave tool path solution further comprises a third movement working together with the first movement and the second movement. The third movement may apply machining feeds that adapted to give uniform surface finishing of the work piece. The machining feeds are regulated by adjusting radial offset of the machining tool with respect to the contact point. With the involvement of the third movement, the robot system may generate a self-adaption wave tool path and ensure the processing quality.

The wave tool paths are generated by computer programs based on various parameters. These parameters may include the shape of the selected tool, the contact height, the wave depth, the cycle length, and/or other types of factors that help programmers to set up the robot system quickly and accurately.

Figure 5:
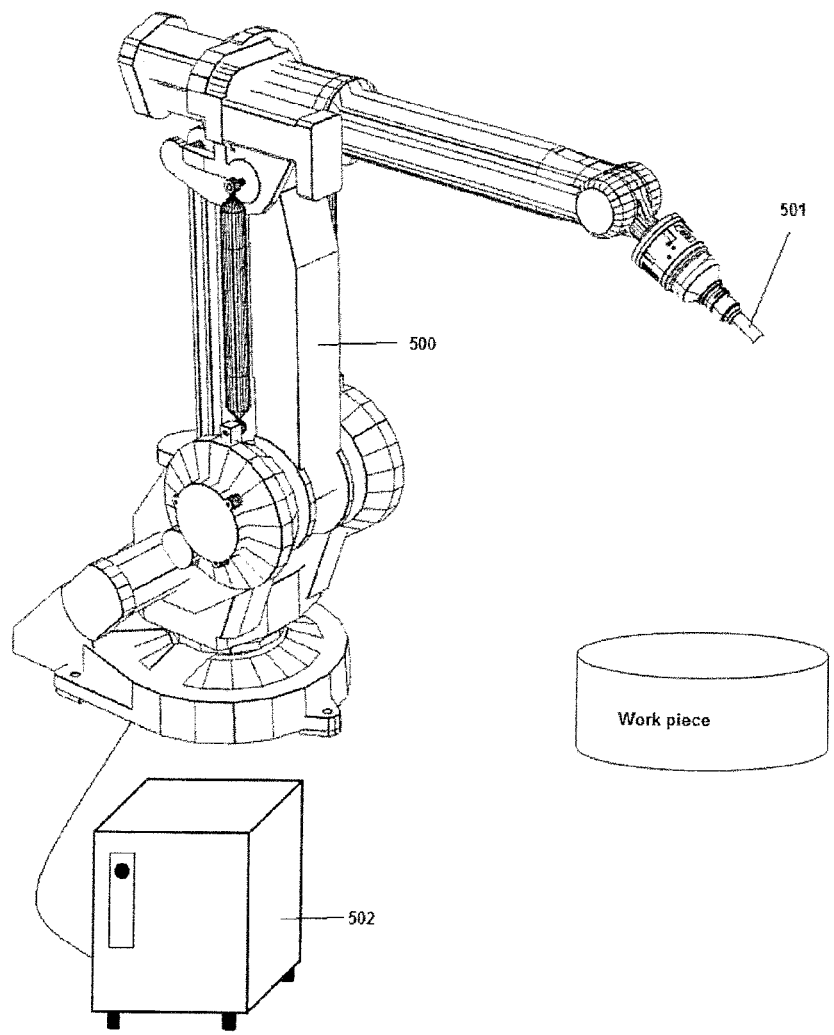
FIG. 5 illustrates a robot system performing the machining process according to an embodiment of present invention.

FIG. 5 illustrates a robot system performing the machining process according to an embodiment of present invention. As shown in FIG. 5, the robot system 5 includes a manipulator 500, a machining tool 501 and a controller 502. The manipulator 500 is arranged to hold the machining tool 501. The controller 502 can be offline programmed to control the manipulator 500 to operate the machining tool 501 according to the method as described above.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A method for machining a work piece by a machining tool, comprising:
   relatively moving the machining tool against the work piece along a first movement and a second movement to apply machining feeds therebetween, the first movement being a normal tool path defining an area of the work piece to be machined and the second movement being an axial offset along an axis of the machining tool;
   wherein:
   the contact points at the work piece are arranged on the area of the work piece to be machined; and
   the first and second movements are synchronized such that the contact points at the machining tool form a plurality of evenly distributed curves on the machining tool surface.

2. The method according to claim 1, wherein:
   the machining feeds are adapted to give uniform surface finishing of the work piece.

3. The method according to claim 2, further comprising rotating the machining tool along its axis.

4. The method according to claim 3, wherein at least two contact points on each of the curves are overlapped.

5. The method according to claim 3, further comprising rotating the machining tool along its axis; and
   wherein at least two contact points on each of the curves are overlapped.

6. The method according to claim 2, wherein the machining feeds are further regulated by moving the machining tool along a third movement, the third movement adjusting a radial offset of the machining tool with respect to the contact point.

7. The method according to claim 1, further comprising:
   rotating the machining tool along its axis.

8. The method according to claim 7, wherein:
   at least two contact points on each of the curves are overlapped.

9. The method according to claim 8, wherein each of the curves is a periodical wave.

10. The method according to claim 9, wherein the periodical wave is sine-shaped or cosine-shaped.

11. The method according to claim 8, wherein the machining feeds are further regulated by moving the machining tool along a third movement, the third movement adjusting a radial offset of the machining tool with respect to the contact point.

12. The method according to claim 7, wherein:
    each of the curves is a periodical wave.

13. The method according to claim 12, wherein:
    the periodical wave is sine-shaped or cosine-shaped.

14. The method according to claim 7, wherein the machining feeds are further regulated by moving the machining tool along a third movement, the third movement adjusting a radial offset of the machining tool with respect to the contact point.

15. The method according to claim 1, wherein:
    the machining feeds are further regulated by moving the machining tool along a third movement, the third movement adjusting a radial offset of the machining tool with respect to the contact point.

16. The method according to claim 15, wherein:
    the radial offset of the machining tool is adjusted to the radius of the machining tool with respect to the contact point.

17. The method according to claim 15, wherein each of the curves is a periodical wave.

18. The method according to claim 17, wherein the periodical wave is sine-shaped or cosine-shaped.

19. A robot system for machining a work piece, including:
    a manipulator;
    a machining tool; and
    a controller, being adapted for controlling the manipulator to operate the machining tool to:
    relatively move the machining tool against the work piece along a first movement and a second movement to apply machining feeds therebetween, the first movement being a normal tool path defining an area of the work piece to be machined and the second movement being an axial offset along an axis of the machining tool;
    wherein:
    the contact points at the work piece are arranged on the area of the work piece to be machined; and
    the first and second movements are synchronized such that the contact points at the machining tool form a plurality of evenly distributed curves on the machining tool surface.

* * * * *